(12) United States Patent
Lachowicz et al.

(10) Patent No.: US 7,166,648 B2
(45) Date of Patent: *Jan. 23, 2007

(54) PHOTOINITIATOR, NOVEL COMPOUND, AND PHOTOCURABLE COMPOSITION

(75) Inventors: Artur Lachowicz, Berlin (DE); Kai-Uwe Gaudl, Hohen Neuendorf (DE); Jens Ferbitz, Berlin (DE); Gerwald F. Grahe, Berlin (DE); Yu Jing, Qingdao (CN); Wu Guanghui, Qingdao (CN)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/507,209

(22) PCT Filed: Apr. 3, 2003

(86) PCT No.: PCT/JP03/04282

§ 371 (c)(1), (2), (4) Date: Sep. 14, 2004

(87) PCT Pub. No.: WO03/082929

PCT Pub. Date: Oct. 9, 2003

(65) Prior Publication Data

US 2005/0256218 A1    Nov. 17, 2005

(30) Foreign Application Priority Data

Apr. 3, 2002 (EP) ................................. 02007306

(51) Int. Cl.
*C08F 2/46* (2006.01)

(52) U.S. Cl. ............... 522/36; 522/107; 522/182; 522/183

(58) Field of Classification Search ............... 522/36, 522/107, 182
See application file for complete search history.

(56) References Cited

U.S. PATENT DOCUMENTS

| | | | | |
|---|---|---|---|---|
| 3,974,052 A * | 8/1976 | Heap et al. | ............ | 522/18 |
| 4,088,554 A * | 5/1978 | Felder et al. | ............ | 522/36 |
| 4,151,056 A * | 4/1979 | Park | ............ | 522/89 |
| 5,144,057 A * | 9/1992 | Eyer | ............ | 560/51 |
| 5,945,489 A * | 8/1999 | Moy et al. | ............ | 525/471 |
| 6,020,528 A | 2/2000 | Leppard et al. | | |
| 6,025,410 A * | 2/2000 | Moy et al. | ............ | 522/182 |
| 6,204,302 B1 * | 3/2001 | Rawls et al. | ............ | 522/8 |
| 6,486,345 B1 * | 11/2002 | Schroer | ............ | 560/174 |
| 6,673,851 B1 * | 1/2004 | Moy et al. | ............ | 522/173 |
| 6,924,324 B1 * | 8/2005 | Gaudl et al. | ............ | 522/182 |

FOREIGN PATENT DOCUMENTS

GB  2 310 855 A    9/1997
GB  2 335 424 A *  9/1999

* cited by examiner

*Primary Examiner*—Susan Berman
(74) *Attorney, Agent, or Firm*—Armstrong, Kratz, Quintos, Hanson & Brooks, LLP

(57) ABSTRACT

A photoinitiator is provided which exhibits excellent photosensitivity, yields colorless products, and is usable in thick layer UV curable coating. A novel chemical compound is also provided which is usable for the photoinitator. Photocurable composition is also provided which has these properties. The photoinitiator consists essentially of a compound having a molecular weight of 1000 or less, and having a chemical structure represented by the following formula (1),

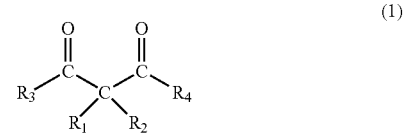

(1)

wherein $R_3$ and $R_4$ independently denote a specific alkyl group, and $R_1$ and $R_2$ independently denote an electron attracting group or a specific alkyl group, and weight percentage of a chemical structure element represented by the following formula (2),

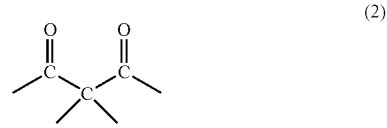

(2)

which is expressed in formula (1) based on the total molecular weight of the compound, is 17% to 54% by mass.

14 Claims, No Drawings

PHOTOINITIATOR, NOVEL COMPOUND, AND PHOTOCURABLE COMPOSITION

TECHNICAL FIELD

The present invention relates to photoinitiators, a novel compound, and photocurable compositions including a photoinitiator. More specifically, the present invention relates to photoinitiators which are usable in thick-layer UV curable coatings.

BACKGROUND ART

In recent years, photoinitiators are gaining in importance in the field of UV-light and daylight curable resin compositions, such as photocurable coatings or photocurable printing inks, which may be applicable to a wide range of substrates including metal, paper, plastics and wood, since the photoinitiators can drastically increase curing rate.

In this field, highly sensitive photoinitiators are desired, which are capable of absorbing enough UV or daylight, and producing radicals that start polymerization or transferring the absorbed energy to polymerizable substances for formation of radicals.

Conventionally, photoinitiators have been repeatedly studied so far with the aim of enhancing sensitivity, and improving inherent technical problems such as yellowing. In order to overcome these general problems, for example, alkylphenylbisacrylphosphine oxides, and photoinitiator mixtures of an alkylphenylbisacrylphosphine oxide with benzophenone are disclosed in U.S. Pat. No. 6,020,528.

The conventional photoinitiators, such as alkylphenylbisacylphosphine oxides exhibit a good curability, particularly when used in thin layer photocurable coatings. However, the photoinitiators are difficult to use for UV curing of coatings having a greater layer thickness. This is because the self-absorption of the photoinitiator molecule containing aromatic structure elements is large.

Furthermore, the photoinitiators of the alkylphenylbisacylphosphine oxide type exhibit an improved yellowing behavior in comparison with other conventional photoinitiators (e.g., benzophenone). However, the problem of yellowing has not been completely solved thus far. Therefore, there is a strong need for a photoinitiator showing significant improvement regarding yellowing.

DISCLOSURE OF INVENTION

It is therefore an object of the invention to provide a photoinitiator which exhibits excellent photosensitivity, yields colorless products, and is also usable in thick layer UV curable coatings.

Another object is to provide a novel chemical compound which is usable for the photoinitator. Furthermore, another object is to provide a photocurable composition having aforesaid properties.

Unexpectedly, the inventors have now found that a compound having a chemical structure represented by the following formula (1) has excellent photoactivity with UV irradiation, and is well suited for photopolymerization of radical curable ethylenic unsaturated compounds.

Accordingly, the present invention provides a photoinitiator consisting essentially of a compound having a molecular weight of 1000 or less, and having a chemical structure represented by the following formula (1),

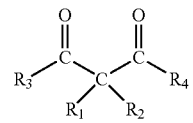

wherein $R_3$ and $R_4$ independently denote an alkyl group having a carbon number of 1 to 8, and $R_1$ and $R_2$ independently denote 1) an electron attracting group,
2) an alkyl group having a carbon number of 1 to 8, or
3) an alkyl group having a carbon number of 1 to 8, which has an electron attracting group at the β, γ, or δ position with respect to both of the carbonyl groups, wherein the alkyl group 2) is methyl or ethyl group when each of the two substituents is the alkyl group 2), and mass percentage of a chemical structure element represented by the following formula (2),

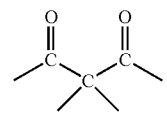

which is expressed in formula (1), based on the total molecular weight of the compound having the chemical structure represented by formula (1), is within the range of 17% to 54%.

The present invention also provides a photoinitiator consisting essentially of a compound having a molecular weight of 1000 or less, and having a chemical structure represented by the following formula (3),

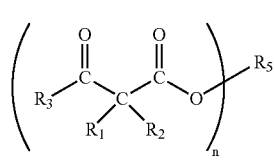

wherein $R_3$ denotes an alkyl group having a carbon number of 1 to 8, $R_5$ denotes a mono-, di-, tri-, tetra- or pentavalent aliphatic hydrocarbon group or an alkyleneoxy group-substituted aliphatic hydrocarbon group, n is a natural number of 1 to 5, and $R_1$ and $R_2$ independently denote 1) an electron attracting group,
2) an alkyl group having a carbon number of 1 to 8, or
3) an alkyl group having a carbon number of 1 to 8, which has an electron attracting group at the β, γ, or δ position with respect to both of the carbonyl groups, wherein the alkyl group 2) is methyl or ethyl group when each of the two substituents is the alkyl group 2), and weight percentage of a chemical structure element represented by the following formula (2),

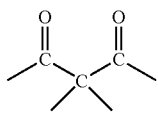

(2)

which is expressed in formula (3), based on the total molecular weight of the compound having the chemical structure represented by formula (3), is within the range of 17% to 47%.

The present invention also provides a novel compound having a chemical structure represented by the following formula (7),

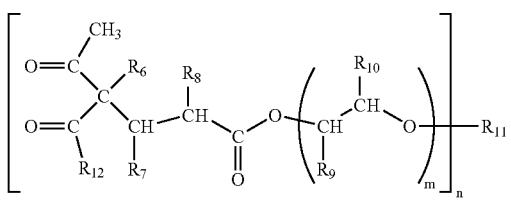

(7)

wherein $R_6$ denotes an alkyl group having a carbon number of 1 to 8, a $C_{1-4}$ alkyl carbonyl group, a cyano group, a $C_{1-4}$ alkyl carbonyl methyl group, a $C_{1-4}$ alkyl carbonyl ethyl group, a $C_{1-4}$ alkoxy carbonyl methyl group, a $C_{1-4}$ alkoxy carbonyl ethyl group, and an alkyl group having a carbon number of 1 to 8 which is substituted by carboxyl group or cyano group, $R_7$, $R_8$, $R_9$, and $R_{10}$ independently denote a hydrogen atom, or a methyl group, and at least one of $R_9$ and $R_{10}$ is a hydrogen atom, $R_{11}$ denotes a di-, tri- or tetra-valent aliphatic hydrocarbon group having a carbon number of 2 to 12, $R_{12}$ denotes a methyl group, or an alkoxy group having a carbon number of 1 to 18, n is a natural number of 2 to 4, and m is an integer of 0 to 15.

The present invention also provides a photocurable composition comprising, an above-mentioned photoinitiator, and a radical curable ethylenic unsaturated compound.

BEST MODE FOR CARRYING OUT THE INVENTION $R_3$ and $R_4$, defined as an alkyl group having a carbon number of 1 to 8 in the aforementioned chemical structure represented by formula (1) or the aforementioned chemical structure represented by formula (3), may be a linear or branched alkyl group, which include methyl, ethyl, propyl, isopropyl, n-butyl, t-butyl, pentyl, hexyl, cyclohexyl, n-heptyl, and n-octyl groups. Among these structures, in particular, a methyl group is preferable from the veiwpoints of photosensitivity.

$R_5$, defined as an aliphatic hydrocarbon, includes a linear or branched alkyl group such as methyl, ethyl, propyl, isopropyl, n-butyl, t-butyl, pentyl, hexyl, cycro-hexyl, n-heptyl, n-octyl, and a multi-functional aliphatic hydrocarbon group such as ethylene, propylene, trimethylol propane residual group, or pentaerythritol residual group.

$R_5$, defined as an alkyleneoxy group-substituted aliphatic hydrocarbon group, includes an alkyl group obtained by a reaction of methanol, ethanol, propanol, isopropanol, n-butanol, t-butanol, pentanol, hexanol, cyclohexanol, n-heptanol, n-octanol, ethylene glycol, propylene glycol, neopentyl glycol, trimethylol propane, or pentaerythritol and ethylene oxide or propylene oxide.

$R_1$ and $R_2$ in the aforementioned chemical structure represented by formula (1) or the aforementioned chemical structure represented by formula (3) is selected from the group consisting of 1) an electron attracting group, 2) an alkyl group having a carbon number of 1 to 8, and 3) an alkyl group having a carbon number of 1 to 8, which has an electron attracting group at the β, γ, or δ position with respect to both of the carbonyl groups.

Examples of the electron attracting groups 1) include a ketone group such as acetyl group, an ester group, an ether group, a carboxyl group, a cyano group, a sulfonic acid group, a sulfonyl group, or a phosphate group.

The definition of alkyl group 2), having a carbon number of 1 to 8, is the same as the definition of the abovementioned $R_3$ or $R_4$.

The alkyl group having a carbon number of 1 to 8, which has an electron attracting group at the β, γ, or δ position with respect to both of the carbonyl groups 3) include the following structures.

[β Position Substituted Groups]

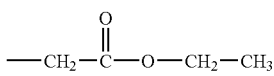

1

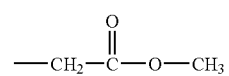

2

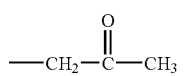

3

[γ Position Substituted Groups]

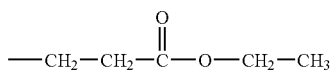

4

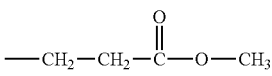

5

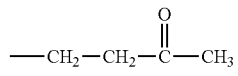

6

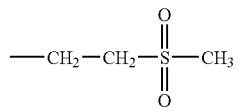

7

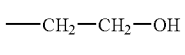

8

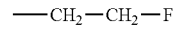

9

-continued

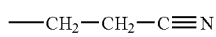
10

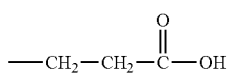
11

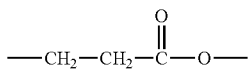
12

[β Position and γ Position Substituted Group]

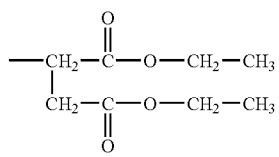
13

[δ Position Substituted Groups]

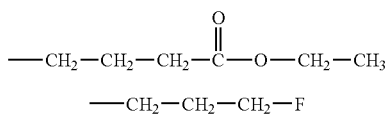
14

15

Here, the γ position substituted group No. 12 may be connected with another β-dicarbonyl units via an alkylene group, a poly(alkyleneoxy) alkylene group, or a residual structure of poly-functional archol.

In this invention, these groups may be selected randomly as $R_1$ or $R_2$; however, when each of the two substituents is the alkyl group 2), methyl or ethyl group must be selected as the alkyl group 2) in order to produce at least one radical by photoirradiation.

Among these above-mentioned groups, particularly preferred groups are Nos. 4, 5 and 12, from the viewpoint of photosensitivity as well as their ease of production.

In this invention, the compound having the chemical structure represented by formula (1) or the aforementioned chemical structure represented by formula (3), is characterized in having a molecular weight of 1000 or less, that is, a compound having the molecular weight range is usable as an additive type photoinitiator, and furthermore, exhibits good compatibility with radical curable monomers, oligomers, or polymers. Furthermore, a compound having a molecular weight in the above range can give its cured products hardness and solvent resistance.

The preferable range of the molecular weight is 700 or less, from the viewpoint of the compatibility, and also from the viewpoint of hardness and solvent resistance of a cured composition which contains the compound.

Furthermore, the compound having the chemical structure represented by formula (1) or the chemical structure represented by formula (3), is characterized in that the mass percentage of a chemical structure element represented by the following formula (2),

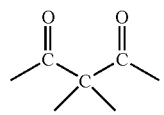
(2)

which is expressed in formula (1) or formula (3), based on the total molecular weight of the compound, is within the range of 17% to 54% by mass. The excellent photosensitivity of the present invention results from the above range of the mass percentage of the chemical structure element represented by formula (2).

Examples of the compound having the chemical structure represented by formula (1) are
3,3-Dimethyl-2,4-pentandione,
3,3-Diethyl-2,4-pentandione,
3-Acetyl-3-methyl-4-oxo-pentanoic acid ethyl ester,
4-Acetyl-4-methyl-5-oxo-hexanoic acid ethyl ester,
4-Acetyl-4-methyl-5-oxo-hexanoic acid butyl ester,
4-Acetyl-4-methyl-5-oxo-hexanoic acid hexyl ester,
4-Acetyl-4-methyl-5-oxo-hexanoic acid octyl ester,
4-Acetyl-4-methyl-5-oxo-hexanoic acid cyclopentadienyl ester,
4-Acetyl-4-methyl-5-oxo-hexanoic acid (2-hydroxyethyl) ester,
4-Acetyl-4-methyl-5-oxo-hexanoic acid cyclopentadienyl ester,
4-Acetyl-4-methyl-5-oxo-hexanoic acid isobornyl ester,
5-Acetyl-5-methyl-6-oxo-heptanoic acid ethyl ester,
Diethyl 2,2-diacetyl-1,5-pentanedioate represented by the following formula,

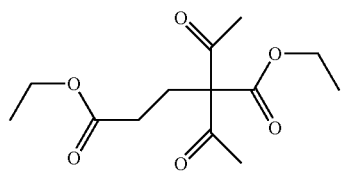

3,3-Diacetyl-hexanedioic acid diethyl ester represented by the following formula,

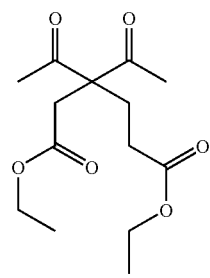

4,4-Diacetyl heptanedioic acid 1,7-diethyl ester
4,4-Di-(1-oxopropyl)-heptanedioic acid 1,7-dimethyl ester 3,3-Diacetyl-1,5-dicyanopentane,
5,5-Diacetyl nonane-2,8-dione,
4,4-Diacetyl-heptanedioic acid 1,7-di-tert-butyl ester
4,4-Diacetyl-1,7-heptanedioic acid
3,3-Diacetyl-1,5-bis(methylsulfonyl)-pentane
4,4-Diacetyl-7-oxo-octanoic-ethyl ester
4,4-Diacetyl-5-(ethoxycarbonyl)-heptanedioic acid diethyl ester represented by the following formula,

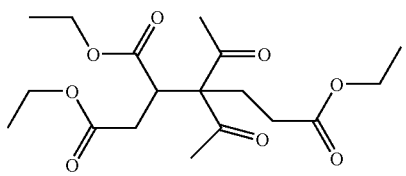

a compound having two β-dicarbonyl groups such as 3-{4-Acetyl-4-[2-(ethoxycarbonyl)ethyl]-5-oxohexanoyloxy}-2,2-dimethylpropyl ethyl 4,4-diacetylheptane-1,7-dioate represented by the following formula,

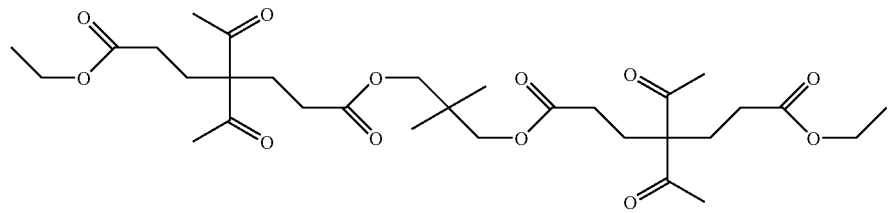

a compound having three β-dicarbonyl groups such as 2,2-Bis({4-acetyl-4-[2-(ethoxycarbonyl)ethyl]-5-oxohexanoyloxy}methyl)butyl ethyl 4,4-diacetylheptane-1,7-dioate represented by the following formula, Examples of the compound having the chemical structure represented by formula (3) are 2-Acetyl-2-ethyl-pentanedioic acid 1,5-diethyl ester, Diethyl 2-acetyl-2-(ethoxycarbonyl)-1,5-pentanedioate 3-Acetyl-3-(ethoxycarbonyl)-pentanedioic acid 1,5-dimethyl ester 2-Acetyl-2-(ethoxycarbonyl)-hexanedioic acid 1,6-dimethyl ester 4-Acetyl-4-(methoxycarbonyl)-heptanedioic acid 1,7-dimethyl ester, 4-(Methoxycarbonyl)-4-(1-oxopropyl)-heptanedioic acid 1,7-dimethyl ester, 4-(Ethoxycarbonyl)-4-(2-methyl-1-oxopropyl)-heptanedioic acid-1,7-dimethyl ester 4-(Ethoxycarbonyl)-4-(1-oxobutyl)-heptanedioic acid 1,7-dimethyl ester 4-Acetyl-4-(methoxycarbonyl)-octanedioic acid 1,8-dimethyl ester 4-Acetyl-4-(tert-butoxycarbonyl)-heptanedioic acid 1,7-dimethyl estera compound having two β-dicarbonyl groups such as Dimethyl 4-acetyl-4-[(3-{2,2-bis[2-(methoxycarbonyl)ethyl]-3-oxobutanoyloxy}-2,2-dimethylpropyl)oxycarbonyl]heptane-1,7-dioate represented by the following formula,

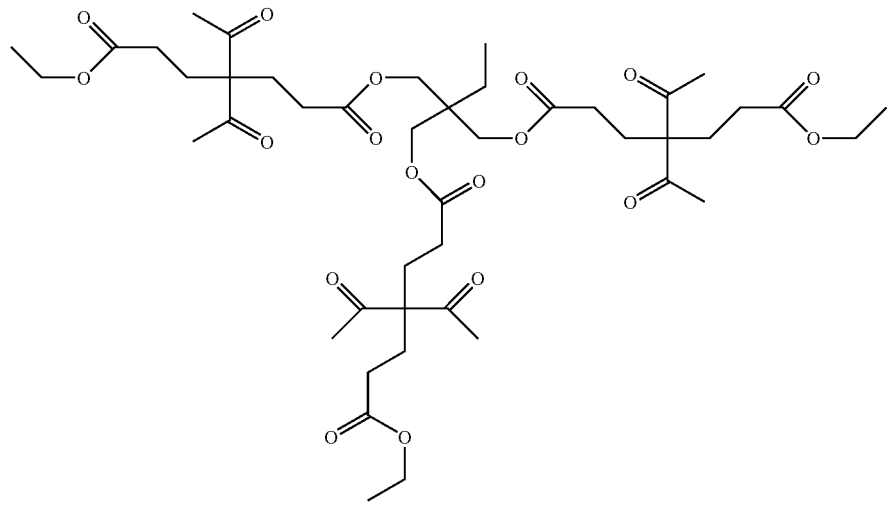

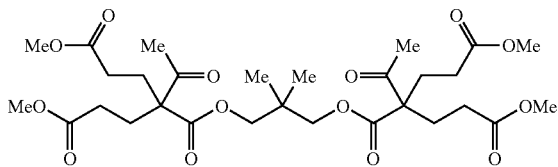

Among these examples, the compounds having the chemical structure represented by formula (1) are preferred due to their excellent photosensitivity. Furthermore, the compounds having identical substituents at α-position of β-dicarbonyl structure are particularly preferred as well. From the viewpoint of ease of production, the compounds only having the above-mentioned γ position substituted group Nos. 4, 5, 12 are particularly preferred.

The novel compound of the present invention has the chemical structure represented by the following formula (7).

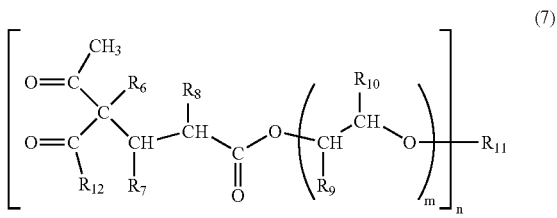

In these formulas, $R_6$ is selected from the group consisting of an alkyl group having a carbon number of 1 to 8, a C1–4 alkyl carbonyl group, a cyano group, a C1–4 alkyl carbonyl methyl group, a C1–4 alkyl carbonyl ethyl group, a C1–4 alkoxy carbonyl methyl group, a C1–4 alkoxy carbonyl ethyl group, and a alkyl group having a carbon number of 1 to 8 which is substituted by carboxyl group or cyano group.

The definition of the alkyl group having a carbon number of 1 to 8 is the same as the definition of the above-mentioned $R_3$ or $R_4$.

The C1–4 alkyl carbonyl group includes acetyl group, ethyl carbonyl group, propyl carbonyl group, or butyl carbonyl group.

The C1–4 alkyl carbonyl methyl group includes 2-oxopropyl group, 2-oxobutyl group, 2-oxopentyl group, and 2-oxohexyl group.

The C1–4 alkyl carbonyl ethyl group includes 3-oxobutyl group, 3-oxopentyl group, 3-oxohexyl group, and 3-oxoheptyl group. The C1–4 alkoxy carbonyl methyl group includes methoxy carbonyl methyl group, ethoxy carbonyl methyl group, propoxy carbbnyl methyl group, butoxy carbonyl methyl group.

The C1–4 alkoxy carbonyl ethyl group includes methoxy carbonyl ethyl group, ethoxy carbonyl ethyl group, propoxy carbonyl ethyl group, butoxy carbonyl ethyl group.

The alkyl group having a carbon number of 1 to 8 which is substituted by carboxyl group or cyano group includes carboxyl group- or cyano group-substituted methyl groups, ethyl groups, propyl groups, isopropyl groups, n-butyl groups, t-butyl groups, pentyl groups, hexyl groups, cyclohexyl groups, n-heptyl groups, n-octyl groups.

$R_7$, $R_8$, $R_9$, and $R_{10}$ independently denote hydrogen atom, or a methyl group. Here, at least one of $R_9$ or $R_{10}$ is a halogen atom.

$R_{11}$ denotes a di-, tri-, tetra-valent aliphatic hydrocarbon group having a carbon number of 2 to 12. Examples of the $R_{11}$ are ethylene, propylene, trimethylol propane residual group, and pentaerythritol residual group. Here, n is an integer of 2 to 4, and m is an integer of 0 to 15.

Furthermore, $R_{12}$ denotes a methyl group, or an alkoxy group having a carbon number of 1 to 18.

Examples of the alkyoxy group include a linear or branched alkoxy group such as methoxy, ethoxy, propoxy, isopropoxy, n-butoxy, t-butoxy, pentyl-oxy, hexyl-oxy, cycrohexyl-oxy, n-heptyl-oxy, n-octyl-oxy, decyl-oxy, undecyl-oxy, lauryl-oxy, tridecyl-oxy, myristyl-oxy, pentadecyl-oxy, cetyl-oxy, heptadecyl-oxy, and stearyl-oxy.

Among these novel compounds, the compounds having a molecular weight of 1000 or less are preferable as well as the above-mentioned photoinitiators from the viewpoints of compatibility and the cured product properties. Furthermore, it is particularly preferred that the novel compounds have the chemical structure element represented by formula (2) at the rate of 17% to 54% by mass from the viewpoint of its photosensitivity if $R_{12}$ is a methyl group. On the other hand, if $R_{12}$ is an alkoxy group having a carbon number of 1 to 18, the range of 17% to 47% by mass of the content of the chemical structure element represented by formula (2) is preferable.

Moreover, in the chemical structure represented by formula (7) or (8), formulas of m=0 are preferable from the viewpoints of balance of their molecular weight and the content of the chemical structure element represented by formula (2).

Some of the above-mentioned examples belong to the preferable novel compounds of the present invention such as 3-{4-Acetyl-4-[2-(ethoxycarbonyl)ethyl]-5-oxohexanoyloxy}-2,2-dimethylpropyl ethyl 4,4-diacetylheptane-1,7-dioate represented by the following formula,

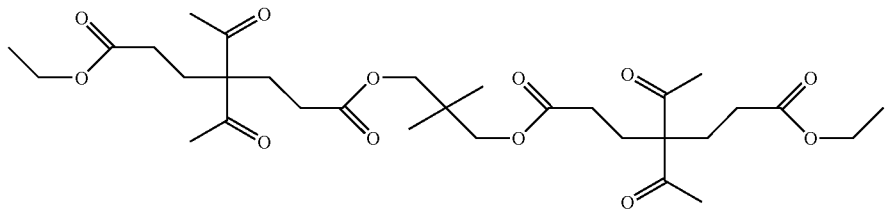

a compound having three β-dicarbonyl groups such as 2,2-Bis({4-acetyl-4-[2-(ethoxycarbonyl)ethyl]-5-oxohexanoyloxy}methyl)butyl ethyl 4,4-diacetylheptane-1,7-dioate represented by the following formula,

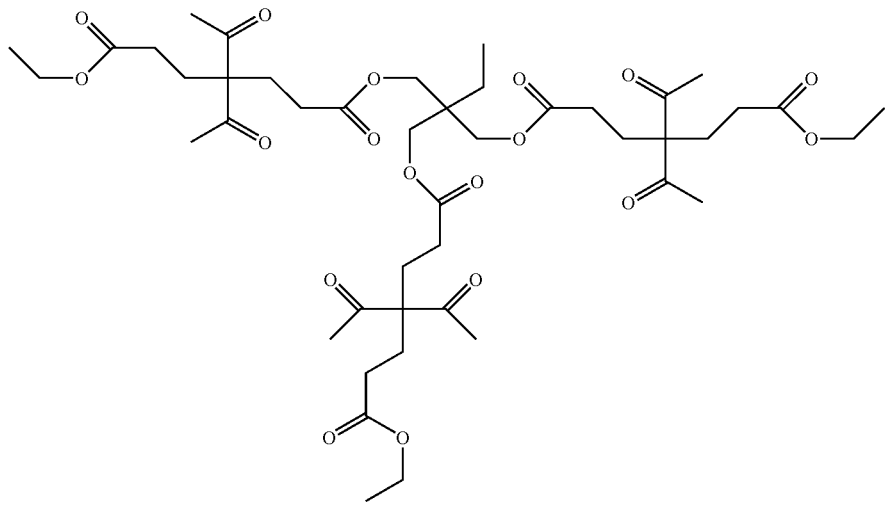

These compounds can be prepared by standard well-known organic syntheses, such as alkylation and Michael addition. The alkylation can be carried out by the reaction of a β-diketone or a β-ketoester having an acidic H atom with a halogenated alkane in the presence of a base catalyst such as potassium carbonate. The Michael addition can be carried out by the reaction of a β-diketone or a β-ketoester having an acidic H atom with an ethylenic unsaturated compound having an electron attracting group in the presence of a base catalyst.

Among them, the Michael addition is particularly suitable for producing the compounds of the present invention.

Examples of suitable ethylenic unsaturated compounds having an electron attracting group, hereinafter abbreviated to "activated vinyl compound", as a starting material of the Michael addition are, for example, acrylic acid esters, methacrylic acid esters, acryl amide, N-vinyl pyrrolidone or acrylonitirile.

Furthermore, specific examples thereof include, acrylic acid methyl ester, acrylic acid ethyl ester, acrylic acid butyl ester, acrylic acid hexyl ester, acrylic acid 2-ethyl hexyl ester, acrylic acid octyl ester, acrylic acid ethyl ester cyclopentadienyl ester, acrylic acid isobornyl ester, acrylic acid 2-hydroxyethyl ester, acrylic acid 2-hydroxypropyl ester, propylenglykol mono acrylic acid ester, acrylic acid 2-carboxyethyl ester, acrylonitrile, vinyl methyl ketone and acryl amide.

Furthermore, in the case of producing a compound having at least two β-diketone units per molecule, preferable examples of activated vinyl compound include 1,2-ethanediol diacrylate, 1,2-propanediol diacrylate, 1,4-butanediol diacrylate, hexan-1,6-diol diacrylate, dipropylene glycol diacrylate, neopentyl glycol diacrylate, ethoxylated neopentyl glycol diacrylate, propoxylated neopentyl glycol diacrylate, tripropylene glycol diacrylate, polyethylene glycol diacrylate, trimethylolpropane triacrylate, ethoxylated trimethylolpropane triacrylate, propoxylated trimethylolpropane triacrylate, propoxylated glycerine triacrylate, tris (2-acryloyloxy ethyl) isocyanurate, pentaerythritol triacrylate, ethoxylated pentaerythritol triacrylate, pentaerythritol tetraacrylate, ethoxylated pentaerythritol tetraacrylate, di (trimethylolpropane) tetraacrylate, di (pentaerythritol) pentaacrylate, di (pentaerythritol) hexaacrylate.

Examples of the β-diketone or β-ketoester having an acidic H atom, typically have two carbonyl groups at the 1,3-position and one or preferably two acidic protons at the α position.

Examples of the compounds, which are suitable to synthesize the compounds related to this invention, are pentane-2,4-dione, hexane-2,4-dione, heptane-2,4-dione, 1-methoxy-pentan-2,4-dion, propionyl acetic acid ethyl ester, propionyl. acetic acid butyl ester, butyryl acetic acid methyl ester, acetoacetic acid methyl ester, acetoacetic acid ethyl ester, acetoacetic acid isopropyl ester, acetoacetic acid butyl ester, acetoacetic acid tert-butylester, acetoacetic acid 2-methoxyethyl ester, acetoacetic acid 2-ethylhexyl ester, acetoacetic acid lauryl ester, 2-acetoacetoxyethyl acrylate, 2-acetoacetoxyethyl methacrylate and acetoacetic acid benzyl ester.

Furthermore, in the case of producing a compound having at least two β-diketone units per molecule, preferable examples of activated vinyl compound include neopentyl glycol diacetoacetate, 2-ethyl-2-butyl-1,3-propanediole diacetoacetate, cyclohexanedimethanol acetoacetate, trimethylolpropane triacetoacetate, glycerine triacetoacetate, pentaerithritol triacetoacetate, pentaerithritol tetraacetoacetate, ditrimethylolpropane tetraacetoacetate, and dipentaerithritol hexaacetoacetate.

Furthermore, the β-ketoester includes a β-ketoester of an alkoxy alchol obtained by a reaction of methanol, ethanol, propanol, isopropanol, n-butanol, t-butanol, pentanol, hexanol, cyclohexanol, n-heptanol, n-octanol, ethlene glycol, propylene glycol, trimethylol propane, or pentaerythritol and ethylene oxide.

The Michael addition reaction of the activated vinyl compound with the β-diketone or β-ketoester having an acidic H atom can be accelerated by special catalysts like strong bases and ammonium halides. The amount of catalyst used is within the range of 0.1 to 5.0 weight percent referred to the complete reaction mixture, preferably 0.4 to 2.0 weight percent. Reaction temperature is within the range of 25 to 150° C., preferably 50 to 110° C. During the reaction of the activated vinyl compounds with the β-diketone or β-ketoester having an acidic H atom, the reaction mixture is sparged with air.

Additionally, a polymerization inhibitor can be used in order to avoid unwanted gelation caused by reactive vinyl compounds during synthesis. The amount is within the range of 0.01 to 0.5 weight percent. Suitable polymerization inhibitors are, for example, 4-methoxy phenol, phenothiazin and hydrochinone. By the above described procedure, obtained products are either solid or liquid and can be purified by re-crystallization or distillation under reduced pressure.

The final product of the above-mentioned process is mainly obtained as a compound having a single, well-defined chemical structure. However, when using a poly-functional activated vinyl compound or a poly-functional β-diketone or β-ketoester mentioned above, the final product may be obtained as a mixture containing several structure compounds.

The photoinitiator according to this invention is usable for curing of radical curable monomers, oligomers, or polymers.

That is, the photocurable composition according to the present invention comprises, (i) an above-mentioned photoinitiator, and
(ii) a radical curable ethylenic unsaturated compound An amount of the photoinitiator among the photocurable composition is preferably within the range of 1 to 15 percent by weight. In particular, the amount is preferably within the range of 2 to 10 percent by weight.

Among the radical curable ethylenic unsaturated compounds, especially those which are activated by heteroatoms can be polymerized very well. Examples for this type of compounds are monomers such as acrylic acid esters, methacrylic acid esters, acrylonitrile, acryl amide, acrolein, vinyl acetate, vinyl propionate, N-vinyl pyrrolidone, N-vinyl carbazole, vinyl chloride and vinylidene chloride.

When using these monomers, the present composition can be obtained by dissolving the photoinitiator in the monomers. This is done by stirring or heating the mixture.

Furthermore, the radical curable ethylenic unsaturated compound also includes a compound having two or more radical curable ethylenic unsaturated groups. Examples for these compounds are 1,2-ethanediol diacrylate, 1,2-propanediol diacrylate, 1,4-butanediol diacrylate, hexan-1,6-diol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol A diglycidylether diacrylate, ethoxylated bisphenol A diglycidylether diacrylate, polyethylene glycol diacrylate, trimethylolpropane triacrylate, ethoxylated trimethylolpropane triacrylate, propoxylated trimethylolpropane triacrylate, propoxylated glycerine triacrylate, tris(2-acryloyloxy ethyl) isocyanurate, pentaerythritol triacrylate, ethoxylated pentaerythritol triacrylate, pentaerythritol tetraacrylate, ethoxylated pentaerythritol tetraacrylate, di(trimethylolpropane) tetraacrylate, di(pentaerythritol) pentaacrylate, di(pentaerythritol) hexaacrylate and oligomers and polymers containing acrylate groups obtained by conversion of poly epoxides with acrylic acid (epoxy acrylate) or by conversion of polyester polyol with acrylic acid or monomeric alkyl acrylates (polyester acrylates) or by conversion of isocyanate prepolymers with 2-hydroxyethyl acrylate ((polyurea acrylate) and acrylated soy bean oil and acrylated silicone oil.

The composition of the present invention may contain another conventional photoinitiator as long as the effects of the present invention are not impaired.

The conventional photoinitiator includes benzophenone, Michler's ketone, dialkyl acetophenone, hydroxyalkyl acetophenone, aminoalkyl phenone, acylphosphine oxide and so called sensitizers such as isopropyl thioxanthone and 3-keto cumarine.

Additionally the photocurable composition of the invention may contain so called accelerators such as tributylamine, N-methyl diethanolamine, N-butyl diethanolamine, triethanolamine, piperidine, morpholine, piperazine, and acrylated amines, obtained from 1,6-hexanediol diacrylate and ethanolamine.

In order to prevent inhibition of polymerization by oxygen, a waxy compound can be added in addition to the above components. In consequence of their appropriate solubility in the mixtures, they float on top of the mixture at the start of polymerization and form a thin protecting layer between atmospheric oxygen and the polymerizing mixture. Additionally, auto-oxidizing compounds like allyl ethers can be added that prevent inhibition of polymerization by oxygen in some cases.

Furthermore, the photocurable composition may contain well known additives, for example, silica, cement, talcum, leveling agents, wetting agents like polyelectrolyte, degassers like poly siloxane copolymers, flow and fluxing agents, surfactants, delustering agents, and plasticizers such as a phthalate.

The photocurable composition according to this invention can be obtained by mixing the foregoing respective components uniformly, and can be cured by high-energy rays, preferably ultraviolet rays.

As radiation sources, sunlight or artificial irradiation generated by commercial mercury high-, medium- or low-pressure lamps, or xenon or wolfram lamps, can be used. The wavelength of the applied irradiation is within a range of 200 to 500 nm, preferably 250 to 350 nm. Duration of exposure depends on amount and type of the used photo-initiator and can be selected from a fraction of a second to several minutes. In mass polymerization, exposure time can be within the range of hours as well.

EXAMPLES

Example 1

3,3-Dimethyl-2,4-pentandione

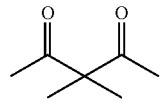

50 g of 2,4-pentandione, 178 g of iodo-methane, 120 g of potassium carbonate, and 340 ml of acetone were mixed and heated to reflux for 18 hours. After cooling, 200 ml of petroleum ether was added, and the solid was filtered off and washed with 300 ml of an one-to-one mixture of petroleum ether. Residual 3-methyl-2,4-pentandione was removed by reacting with ethyl acrylate. The raw product was distilled to yield 23 g of 3,3-dimethyl-2,4-pentandione (boiling point: 63° C./20 mbar; purity: >99%; colorless).

Content of the active structural element $C_3O_2$: 54%.

Example 2

3,3-Diethyl-2,4-pentandione

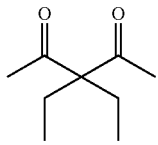

25 g of 2,4-pentandione, 98.3 g of bromo-ethane, 80 g of potassium carbonate, and 175 ml of acetone were mixed and refluxed for 39.5 hours. The solid was filtered off and washed with petroleum ether and acetone. To the liquid layer, 2.0 g of 1,8-diazabicyclo-[5.4.0]-undec-7-ene was added and the mixture was refluxed for two days. After addition of an additional 11.6 g of 1,8-diazabicyclo-[5.4.0]-undec-7-ene and refluxing for seven hours, 25 g of ethyl acrylate was added and the mixture was stirred at room temperature, and the solvent was distilled off and the mixture was refluxed for 8 hours. The base was neutralized by adding acetic acid, washed with an aqueous potassium carbonate solution, and extracted with diethyl ether. The ether layer was dried and the product was isolated by fractional distillation to yield 9 g of product (boiling point 190° C./1000 mbar; purity: 75%; colorless).

Content of the active structural element $C_3O_2$: 44%.

Example 3

3-Acetyl-3-methyl-4-oxo-pentanoic acid ethyl ester

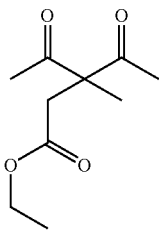

28 g of potassium hydroxide dissolved in 28 ml of water was added to a mixture of 50 g of 2,4-pentandione, and 100 ml and 115 ml of dioxane at 0 to 10° C. After 20 minutes of stirring, 125 g of bromoacetic acid ethyl ester was added dropwise and the mixture was stirred for 19 hours. The layers were separated and washed with water and diethyl ether. The organic layer was dried and 3-acetyl-4-oxo-pentanoic acid ethyl ester was isolated by fractional distillation.

48.3 g of 3-acetyl-4-oxo-pentanoic acid ethyl ester, 41 g of iodo-methane, 34 g of potassium carbonate, and 90 ml of acetone were mixed and refluxed for 9 hours. After cooling, 100 ml of petroleum ether was added, and the solid was filtered off and washed with acetone and petroleum ether. Fractional distillation yielded 33.4 g of 3-acetyl-3-methyl-4-oxo-pentanoic acid ethyl ester (boiling point: 69° C./0.02 mbar; purity: 97%; colorless).

Content of the active structural element $C_3O_2$: 34%.

Example 4

4-Acetyl-4-methyl-5-oxo-hexanoic acid ethyl ester

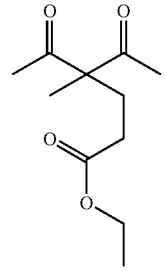

51 g of 2,4-pentandione, 89 g of iodo-methane, 66 g of potassium carbonate, and 170 ml of acetone were refluxed for 7 hours, the mixture was cooled, and 200 ml of petroleum ether was added. After filtration, the solid was washed with acetone and petroleum ether, and 3-methyl-2,4-pentandione was isolated by fractional distillation.

30 g of 3-methyl-2,4-pentandione and 0.4 g of 1,8-diazabicyclo-[5.4.0]-undec-7-ene were mixed and 39.3 g of ethyl acrylate was added dropwise with the temperature being controlled by cooling with ice. Stirring was continued for 16 hours, the base was neutralized, 50 ml of diethyl ether was added, and the mixture was extracted with an aqueous sodium carbonate solution and water. Fractional distillation of the organic layer yielded 33.4 g of 4-acetyl-4-methyl-5-oxo-hexanoic acid ethyl ester (boiling point: 95° C./0.02 mbar; purity: 98%; colorless).

Content of the active structural element $C_3O_2$: 32%.

Example 5

5-Acetyl-5-methyl-6-oxo-heptanoic acid ethyl ester

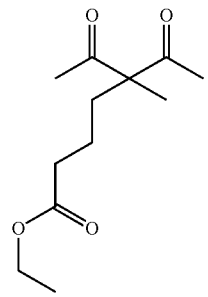

10 g of sodium acetylacetonate and 20 g of potassium carbonate in 50 ml of acetone were heated to reflux and 15 g of bromoacetic acid ethyl ester was added dropwise over 15 minutes. After refluxing for several days, the solid was filtered off and washed with petroleum ether and acetone. Fractional distillation yielded 6.4 g of 5-acetyl-6-oxo-heptanoic acid ethyl ester.

5.5 g of 5-acetyl-6-oxo-heptanoic acid ethyl ester, 5.7 g of potassium carbonate, 15 g of iodo-methane, and 15 ml of acetone were refluxed for 18 hours. After cooling, petroleum ether was added, and the solid was filtered off and washed with acetone and petroleum ether. Fractional distillation and re-distillation yielded 5.11 g of 5-acetyl-5-methyl-6-oxo-heptanoic acid ethyl ester (boiling point: 151° C./20 mbar; purity: 82%; colorless).

Content of the active structural element $C_3O_2$: 30%.

Example 6

2-Acetyl-2-ethyl-pentanedioic acid 1,5-diethyl ester

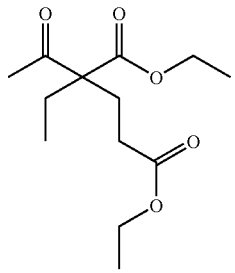

10 g of 2-ethyl ethyl acetoacetate and 0.1 g of 1,8-diazabicyclo-[5.4.0]-undec-7-ene were mixed and 8 g of ethyl acrylate was added at room temperature over 25 minutes. The mixture was stirred for 23 hours, neutralized, poured into 20 ml of diethyl ether, and extracted with an aqueous potassium carbonate solution and water. Fractional distillation of the organic layer yielded 7.5 g of 2-acetyl-2-ethyl-pentanedioic acid diethyl ester (boiling point: 145° C./20 mbar; purity: >99%; colorless).

Content of the active structural element $C_3O_2$: 27%.

Example 7

Diethyl 2,2-diacetyl-1,5-pentanedioate

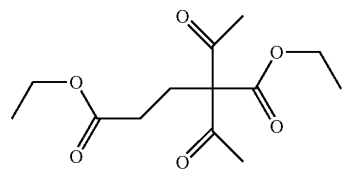

5 g of sodium salt of ethyl acetoacetate was mixed with 30 ml of toluene. Over 20 minutes, 5 g of acetic acid chloride was added dropwise, and the mixture was stirred for one hour at room temperature and at 85° C. for 3 hours. The solid was filtered off and washed with diethyl ether. Fractional distillation of the liquid phase yielded ethyl 2-acetyl-3-oxo-butyrate.

2.0 g of ethyl 2-acetyl-3-oxo-butyrate was mixed with 5 drops of 1,8-diazabicyclo-[5.4.0]-undec-7-ene. Over 10 minutes, 2.7 g of ethyl acrylate was added dropwise. The mixture was stirred for 30 hours at room temperature, 2 ml of acetic acid was added to neutralize the base, and the mixture was extracted with an aqueous sodium carbonate solution and water. Fractional distillation yields 1.5 g of 2,2-diacetyl-1,5-pentanedioic acid diethyl ester (purity: 70%; colorless)

Content of the active structural element $C_3O_2$: 25%.

Example 8

Diethyl 2-acetyl-2-(ethoxycarbonyl)-1,5-pentanedioate

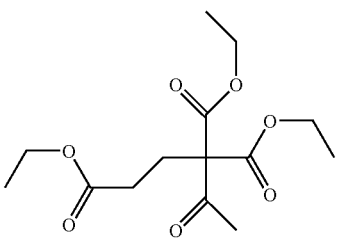

60 g of diethyl 2-carboxyethyl-1,5-pentanoate was added drop by drop to 10.44 g of sodium hydride covered by 100 ml of toluene. When heat-production ceased, 28 g of ethyl chloroformate was added dropwise. When maximum conversion was reached, the pH value was adjusted to 7 by adding hydrochloric acid, the salt was filtered off and the residual liquid fractionated under reduced pressure to yield diethyl 2-acetyl-2-(ethoxycarbonyl)-1,5-pentanedioate (purity: 85%; colorless).

Content of the active structural element $C_3O_2$: 23%.

Example 9

3,3-diacetyl-hexanedioic acid diethyl ester

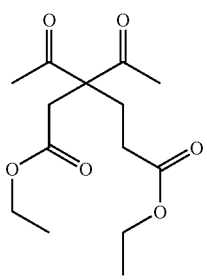

37 g of 3-acetyl-4-oxo-pentanoic acid ethyl ester, synthesized according to the procedure given in Example 15, and 0.3 g of 1,8-diazabicyclo-[5.4.0]-undec-7-ene were mixed, and 30 g of ethyl acrylate was added dropwise over 30 minutes. After stirring for 24 hours, the base was neutralized by adding acetic acid. 80 ml of diethyl ether was added, and the mixture was extracted with 60 ml of an aqueous sodium carbonate solution and 150 ml of water. Fractional distillation of the water-free organic layer yielded 46.2 g of 3,3-diacetyl-hexanedioic acid diethyl ester (boiling point: 150° C./0.03 mbar; purity: >99%; colorless).

Content of the active structural element $C_3O_2$: 24%.

Example 10

3-Acetyl-3-(ethoxycarbonyl)-pentanedioic acid 1,5-dimethyl ester

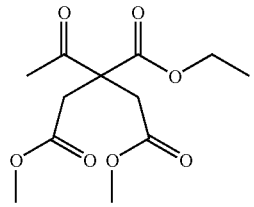

86 g of potassium tert-butylate was dissolved in 150 ml of dimethyl acetamide and 100 g of acetoacetic acid ethyl ester was added drop by drop with stirring. Subsequently, 83 g of chloroacetic acid methyl ester was added dropwise. When the exothermic reaction ended, 5 g of potassium tert-butylate and 5 g of chloroacetic acid methyl ester were added alternately until conversion was complete. The solid was filtered off and washed with ethyl acetate. Fractional distillation yielded 30 g of 3-acetyl-3-(ethoxycarbonyl)-pentanedioic acid dimethyl ester (purity: 91%; colorless).

Content of the active structural element $C_3O_2$: 25%.

Example 11

2-Acetyl-2-(ethoxycarbonyl)-hexanedioic acid 1,6-dimethyl ester

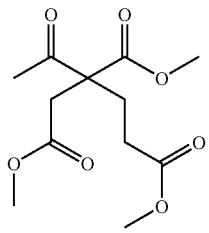

15 g of methyl acrylate was added dropwise to a mixture consisting of 30 g of 2-acetyl-1,4-butyric acid dimethyl ester and 0.5 g of 1,8-diazabicyclo-[5.4.0]-undec-7-ene. The mixture was stirred at 75° C. for 4 hours. After cooling, it was neutralized with acetic acid, washed with an aqueous potassium carbonate solution and was subsequently washed with water, and distilled, and colorless 2-acetyl-2-(ethoxycarbonyl)-hexanedioic acid dimethyl ester was obtained at 95% purity.

Content of the active structural element $C_3O_2$: 25%

Example 12

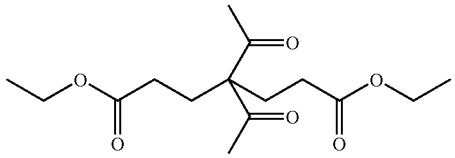

4,4-diacetyl heptahedioic acid 1,7-diethyl ester 20 ml of 2,4-pentandione, 40 ml of ethyl acrylate, and 1.5 g of 1,8-diazabicyclo-[5.4.0]-undec-7-ene were mixed, and stirred for 3 hours at 80° C. in air. The crude product was distilled (boiling point: 155° C./$10^{-2}$ mbar). The distilled product was crystallized in rhombic crystals having purity of 99.4% (gas chromatography). Melting point: 64° C. The product was colorless. Content of the active structural element $C_3O_2$: 23%.

Example 13

4-Acetyl-4-(methoxycarbonyl)-heptanedioic acid 1,7-dimethyl ester 50.0 g of methyl acetoacetate and 100.0 g of methyl acrylate were mixed, and 0.6 g of tetramethyl guanidine and 0.05 g of 4-methoxy phenol were added. The mixture was stirred at 85° C. for 3 hours in air, and the excess methyl acrylate was removed by distillation, leading to a yellowish liquid crude product with a purity of 91%. The final fractional distillation of the crude product yielded the subject compound, which was colorless, having a boiling point: 145° C. ($10^{-2}$ mbar) and purity: GC>99%.

Content of the active structural element $C_3O_2$: 24%.

Example 14

4,4-Di-(1-oxopropyl)-heptanedioic acid 1,7-dimethyl ester

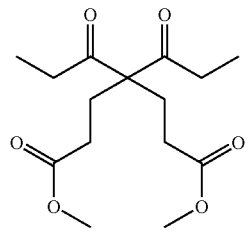

40.0 g (0.465 mol) of methyl acrylate was added drop by drop to 21.9 g (0.171 mol) of 3,5-heptanedione and 0.2 g ($1.3\times10^{-3}$ mol) of DBU. After addition of two thirds of the acrylate, temperature was raised to 40° C. Stirring was continued for three hours, then the mixtures was heated to reflux, and an additional 0.5 g ($3.3\times10^{-3}$ mol) of DBU was added. Refluxing was continued for 6 hours, excess acrylate was distilled off, and the product was isolated by fractional distillation. 22.8 g (0.08 mol) of dimethyl 4,4-di-(1-oxopropyl)-heptanedioate was obtained (boiling temperature: 175° C. at 0.02 mbar; yield: 44%; colorless).

Content of the active structural element $C_3O_2$: 23%.

Example 15

4-(Methoxycarbonyl)-4-(1-oxopropyl)-heptanedioic acid 1,7-dimethyl ester

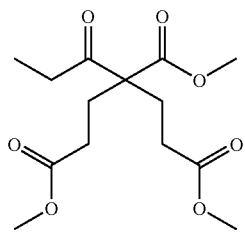

39.9 g (0.31 mol) of methyl 3-oxo-pentanoate and 1.9 g (0.012 mol) of DBU were mixed at room temperature in a three necked round bottom flask, equipped with a dropping funnel and a reflux condenser. 66.4 g (0.77 mol) of methyl acrylate was slowly added drop by drop. After the exothermal behavior has leveled off, the reaction mixture was stirred at 60° C. for an additional two hours. Cyclohexane was added and the mixture was washed with diluted hydrochloric acid and was subsequently washed with distilled water until the aqueous layer showed a neutral reaction. The organic layer was dried over sodium sulfate, the solvent was removed, and the addition product was isolated by fractional distillation in a vacuum. 21.4 g (0.20 mol) of 4-(methoxycarbonyl)-4-(1-oxopropyl)-heptanedioic acid 1,7-dimethyl ester was obtained (yield: 64%; boiling temperature: 130° C. at 0.02 mbar; colorless).

Content of the active structural element $C_3O_2$: 23%.

Example 16

4-(Ethoxycarbonyl)-4-(2-methyl-1-oxopropyl)-heptanedioic acid-1,7-dimethyl ester

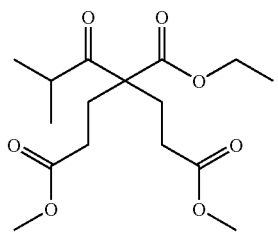

12.0 g (0.08 mol) of ethyl 4-methyl-3-oxo-pentanoate and 0.5 g (0.003 mol) of DBU were placed in a three necked round bottom flask, equipped-with dropping funnel and reflux condenser. At room temperature, 16.0 g (0.18 mol) of methyl acrylate was slowly added drop by drop. After the exothermal behavior of the reaction leveled off, the reaction mixture was stirred at 60° C. for an additional two hours. The mixture was poured into cyclohexane and was washed with diluted hydrochloric acid and was subsequently washed with distilled water until the aqueous layer was neutral. The organic layer was dried over sodium sulfate, the solvent was removed, and the addition product was isolated by fractional distillation in a vacuum. 15.0 g (0.045 mol) of 4-(ethoxycarbonyl)-4-(2-methyl-1-oxopropyl)-heptanedioic acid 1,7-dimethyl ester was obtained (yield: 56%; boiling point: 145° C. at 0.02 mbar; colorless).

Content of the active structural element $C_3O_2$: 21%.

Example 17

4-(Ethoxycarbonyl)-4-(1-oxobutyl)-heptanedioic acid 1,7-dimethyl ester

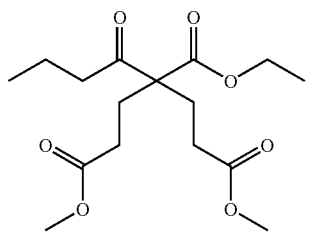

41.2 g (0.26 mol) of ethyl 3-oxo-hexanoate and 1.9 g (0.012 mol) of DBU were placed in a three necked round bottom flask, equipped with dropping funnel and reflux condenser. At room temperature, 56.3 g (0.65 mol) of methyl acrylate was slowly added drop by drop. After the exothermal behavior of the reaction leveled off, the reaction mixture was stirred at 60° C. for an additional two hours. The mixture was poured into cyclohexane and was washed with diluted hydrochloric acid and was subsequently washed with distilled water until the aqueous layer showed a neutral reaction. The organic layer was dried with sodium sulfate, the solvent was removed, and the residual addition product was isolated by fractional distillation in a vacuum. 50.0 g (0.15 mol) of 4-(ethoxycarbonyl)-4-(1-oxobutyl)-heptanedioic acid 1,7-dimethyl ester was obtained (yield: 58%; boiling point: 149° C. at 0.007 mbar; colorless).

Content of the active structural element $C_3O_2$: 21%.

Example 18

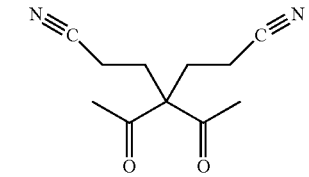

3,3-Diacetyl-1,5-dicyanopentane

After addition of 0.25 g of KOH, dissolved in 2.5 ml of methanol, to 15.0 g of 2,4-pentandione, 35.0 g of acrylonitrile was added dropwise with the reaction temperature not exceeding 40° C. The product which was precipitated during the process was filtered off, washed with a small amount of acetone, and dried. Melting point: 185–186° C. Purity>98%. The product was colorless.

Content of the active structural element $C_3O_2$: 33%.

Example 19

5,5-Diacetyl nonane-2,8-dione

A mixture of 15.0 g of 2–4-pentandione and 0.35 g of tetramethyl guanidine was added to 40.0 g of 2-butanone drop by drop, with the reaction temperature not exceeding 40° C. Then, the excess of 2-butanone was removed by distillation under reduced pressure (200 mbar). The final product was obtained at 96% purity as a colorless product. Melting point: 59° C. Content of the active structural element $C_3O_2$: 28%.

Example 20

4,4-Diacetyl-heptanedioic acid 1,7-di-tert-butyl ester

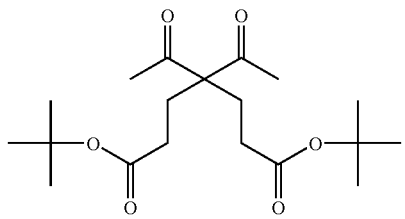

At room temperature, 282 g of tert-butyl acrylate was added dropwise to a mixture of 100 g of 2,4-pentandione and 3 g of 1,8-diazabicyclo-[5.4.0]-undec-7-ene and stirred for 5 hours. A small portion of methanol was added to the mixture at 40° C. A crude product was precipitated from the mixture at room temperature and was recrystallized from methanol to obtain 4,4-diacetyl-heptanedioic acid di-tert-butyl ester as white crystals at a yield of 54% (purity: 100%; colorless).

Content of the active structural element $C_3O_2$: 20%.

Example 21

4,4-Diacetyl-1,7-heptanedioic acid

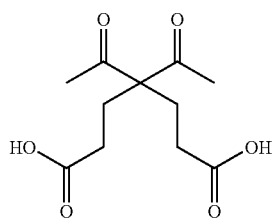

4,4-Diacetyl-heptanedioic acid di-tert-butyl ester was hydrolyzed at 95° C. over 5 hours using a mixture of tert-butanol and water as solvent and 11 weight-% hydrochloric acid. The solvent was removed and the obtained crude product was recrystallized from a mixture of acetone and petroleum ether (1:1) to yield 4,4-diacetyl-heptanedioic acid as white crystals at a yield of 69%. (melting point: 176° C.; purity 94%; colorless).

Content of the active structural element $C_3O_2$: 28%.

Example 22

3,3-Diacetyl-1,5-bis(methylsulfonyl)-pentane

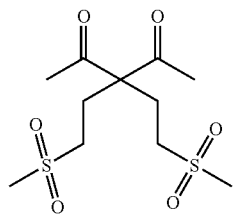

6 g of 2,4-pentandione and 3 drops of triethyl amine were mixed and 7 g of methyl vinyl sulfone was added dropwise at room temperature. After stirring at 60° C. for 7 hours, 5 drops of 1,8-diazabicyclo-[5.4.0]-undec-7-ene were added and the mixture was stirred at room temperature for 12 hours. The mixture was stirred with 25 ml of ethanol and neutralized after a white solid was precipitated. The mixture was poured into 200 ml of water and ice, and was kept in the refrigerator overnight. The solvent was filtered off, dried and recrystallized from 500 ml of ethanol. 2.9 g of white, long needles of the subject compound was obtained (melting point: 162° C.; purity: >99%; colorless).

Content of the active structural element $C_3O_2$: 22%.

Example 23

4,4-Diacetyl-7-oxo-octanoic-ethyl ester

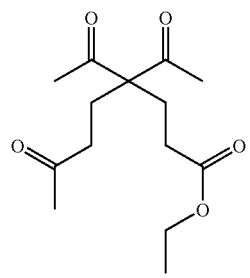

60 g of 2,4-pentandione and 0.1 g of triethyl amine were mixed, and 28 g of 2-butanone was added dropwise at room temperature. The mixture was stirred for 42 hours and the raw product was distilled off. Re-distillation gave 31.4 g of 3-acetyl-2,6-heptandione.

10.2 g of 3-acetyl-2,6-heptandione and 5 drops of 1,8-diazabicyclo-[5.4.0]-undec-7-ene were mixed, and 9 g of ethyl acrylate was added dropwise over 15 minutes. After stirring for 16 hours, the base was neutralized with acetic acid, 30 ml of diethyl ether was added, and the solution was extracted with sodium carbonate solution and water. Fractional distillation of the dry organic layer yielded 9.3 g of 4,4-diacetyl-7-oxo-octanoic-ethyl ester (boiling point: 136° C./0.02 mbar; purity: 81%; colorless).

Content of the active structural element $C_3O_2$: 26%.

Example 24

4,4-Diacetyl-5-(ethoxycarbonyl)-heptanedioic acid diethyl ester

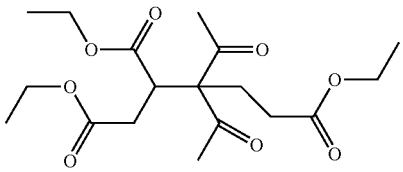

a) To a mixture of 70 g of 2,4-pentandione and 1.72 g of trioctyl phosphine, 45 g of ethyl acrylate was added dropwise over 40 minutes, keeping the temperature at 0–5° C. by cooling. After stirring for 65 hours, 2 ml of acetic acid and 150 ml of diethyl ether were added, and the solution was extracted with an aqueous sodium carbonate solution and water. The organic layer was dried, and 4-acetyl-5-oxohexanoic acid ethyl ester was isolated by fractional distillation.

b) 25.7 g of 4-acetyl-5-oxohexanoic acid ethyl ester and 0.3 g of 1,8-diazabicyclo-[5.4.0]-undec-7-ene were mixed, and 35 g of fumaric acid diethyl ester was added at room temperature over 40 minutes. After stirring for 24 hours, the amount of 1,8-diazabicyclo-[5.4.0]-undec-7-ene was doubled and stirring continued until conversion was complete. 0.5 g of acetic acid and 50 ml of diethyl ether were added, and the solution was extracted with an aqueous potassium carbonate solution and water. Fractional distillation of the dry organic layer yielded 25.6 g of 4,4-diacetyl-5-(ethoxycarbonyl)-heptanedioic acid diethyl ester (boiling point: 170° C./0.002 mbar; purity: 93%; colorless). Content of the active structural element $C_3O_2$: 18%.

Example 25

4-Acetyl-4-(methoxycarbonyl)-octanedioic acid 1,8-dimethyl ester

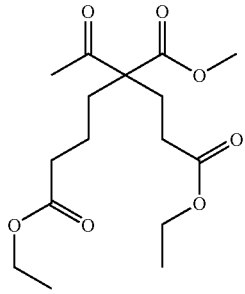

0.3 g of sodium was dissolved in 160 g of methyl acetoacetate, and 86 g of methyl acrylate was added drop by drop at a temperature below 30° C. The reaction was continued for one hour, and subsequently the pH was adjusted to 7. The salt was filtered off and the raw product purified by distillation to yield 2-acetyl pentanoic 5-ethyl-1-methyl ester.

12.5 g of 1,8-diazabicyclo-[5.4.0]-undec-7-ene and 2.3 sodium were dissolved in 50 g of 2-acetyl pentanoic 5-ethyl-1-methyl ester, and 48 g of bromobutyric acid ethyl ester was added drop by drop. When the temperature decreased, an additional 2 g of 1,8-diazabicyclo-[5.4.0]-undec-7-ene was added. After almost all educt was consumed, the salt was filtered off and 4-acetyl-4-(methoxycarbonyl)-octanedioic acid dimethyl ester was isolated by fractional distillation to yield 44 g of colorless product (purity: 94%).

Content of the active structural element $C_3O_2$: 21%.

Example 26

4-Acetyl-4-(tert-butoxycarbonyl)-heptanedioic acid 1,7-dimethyl ester

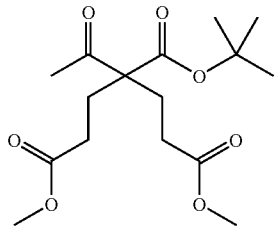

0.5 g of 1,8-diazabicyclo-[5.4.0]-undec-7-ene and 40 g of tert-butyl acetoacetate were stirred at room temperature. 60 g of methyl acrylate was dropped in. The exothermic reaction started immediately. The temperature of the mixture was allowed to reach 80° C. The mixture was stirred at 80° C. for an additional two hours. The basic catalyst was removed by washing with diluted hydrochloric acid and the organic layer was fractionated in a vacuum. The pure colorless 4-acetyl-4-(tert-butoxycarbonyl)-heptanedioic acid 1,7-dimethyl ester boils at 149° C./0.025 mbar (yield: 56 g).

Content of the active structural element $C_3O_2$: 21%.

Example 27

1,1,1-Triacetylethane

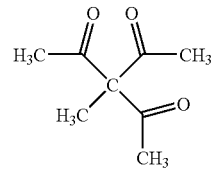

3-methylpentanedione-2,4 was prepared from acetylacetone and methyl iodide in the presence of potassium carbonate (Organic Syntheses, Coll. Vol. V, 785).

57 g of 3-methylpentanedione-2,4 was treated with 12 g of sodium hydride. During this process, the temperature was maintained at 30–40° C. Then, 200 ml of diethyl ether was added, and 39.25 g of acetyl chloride was dropped in. The mixture was stirred for 3 hours in boiling ether and was washed with potassium hydroxide. Diethyl ether was distilled off in a vacuum. The residual slightly yellowish liquid was the crude triacetyl ethane having a purity of above 90%.

Content of the active structural element $C_3O_2$: 44%.

Example 28

4,4-Diacetyl-5-oxohexanoic acid methyl ester

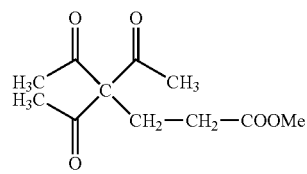

4-acetyl-5-oxohexanoic acid methyl ester was prepared through the Michael addition of methyl acrylate to acetyl acetone in the presence of metallic sodium. The crude product was purified by vacuum distillation and received in a purity of approximately 99%.

92.5 g of 4-acetyl-5-oxohexanoic acid methyl ester was reacted with 11.5 g of metallic sodium in 200 ml of diethyl ether. After the dissolving of sodium was finished, 39.25 g of acetyl chloride was dropped in, and the resulting boiling mixture was stirred for 6 hours. Then, the reaction mixture was filtered, washed with aqueous potassium hydroxide and water, following by evaporation of solvent. The final vacuum distillation yielded the subject compound as a yellowish liquid having a purity of above 90%.

Content of the active structural element $C_3O_2$: 30%.

Example 29

3-{4-Acetyl-4-[2-(ethoxycarbonyl)ethyl]-5-oxohexanoyloxy}-2,2-dimethylpropyl ethyl 4,4-diacetyl-heptane-1,7-dioate The mixture was stirred for three hours to yield a highly viscous colorless oil. Gel permeation chromatography showed a main peak at 690 g/mol, nuclear magnetic resonance spectra and infrared spectrum are according to the expected structure.

Content of the active structural element $C_3O_2$: 22%.

Example 30

2,2-Bis({4-acetyl-4-[2-(ethoxycarbonyl)ethyl]-5-oxohexanoyloxy}methyl)butyl ethyl 4,4-diacetyl-heptane-1,7-dioate

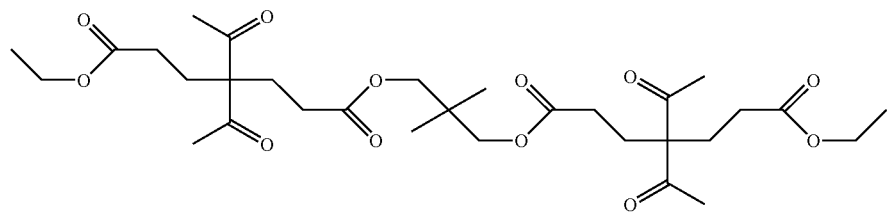

5.0 g of 4-acetyl-5-oxohexanoic acid ethyl ester and five drops 1,8-diazabicyclo-[5.4.0]-undec-7-ene were mixed and 2.6 g of neopentyl glycol diacrylate was added dropwise.

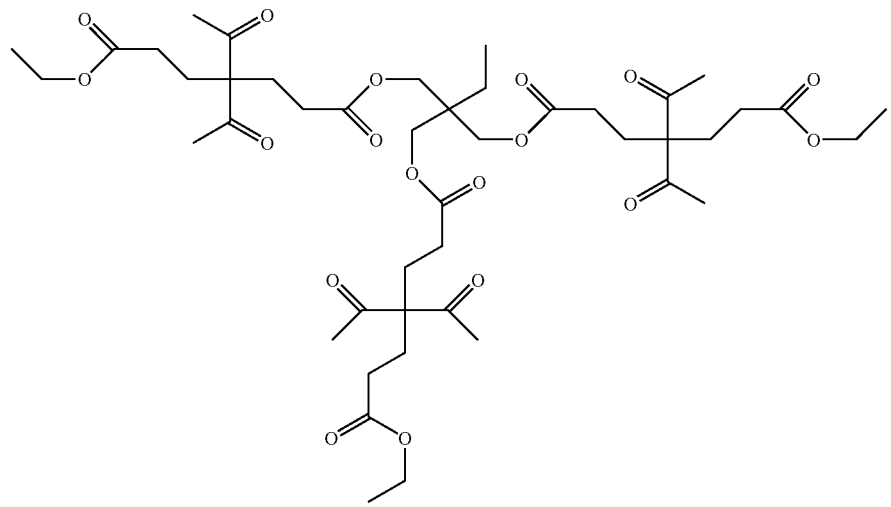

5.0 g of 4-acetyl-5-oxo-hexanoic acid ethyl ester and five drops 1,8-diazabicyclo-[5.4.0]-undec-7-ene were mixed, and 2.4 g of trimethylolpropane triacrylate was added dropwise. The mixture was stirred for three hours to yield a highly viscous colorless oil. Gel permeation chromatography showed a main peak at 958 g/mol, and nuclear magnetic resonance spectra and infrared spectrum were according to the expected structure.

Content of the active structural element $C_3O_2$: 23%.

Example 31

Dimethyl 4-acetyl-4-[(3-{2,2-bis(2-(methoxycarbonyl)ethyl]-3-oxobutanoyloxy}-2,2-dimethylpropyl)oxycarbonyl)heptane-1,7-dioate

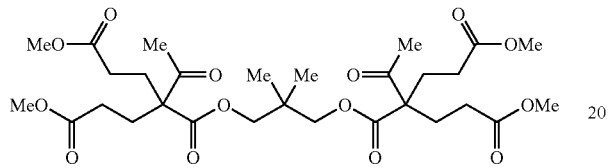

Transesterification of neopentylglycol with ethyl acetoacetate yielded neopentylglycol diacetoacetate. The crude product was isolated through a short-path distillation (110° C. at 0.001 mbar) to yield the pure (>98%) neopentylglycol diacetoacetate as a colorless liquid.

40 g of this diacetoacetate and 0.4 g of 1,8-diazabicyclo-[5.4.0]-undec-7-ene were stirred at room temperature, and 100 g of methyl acrylate was added drop by drop. After the first exothermic reaction finished, the mixture was stirred for 3 hours at 80° C. Then, the excess of methyl acrylate was distilled off in a vacuum. The subject compound remained as a slightly yellowish viscous liquid. Yield was 88 g. Nuclear magnetic resonance spectra and infrared spectrum confirmed the expected structure.

Content of the active structural element $C_3O_2$: 22%.

Example 32

Photoinitiator based on pentaerythritol tetraacetoacetate and ethyl acrylate

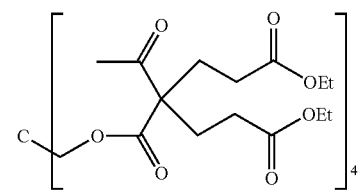

100 g of ethyl acrylate and 2 g of 10% methanolic KOH were added to 50 g of a tetra acetoacetate, synthesized by transesterification of pentaerythritol with ethyl acetoacetate. The mixture was stirred for 3 hours at 80° C. Subsequently the basic catalyst was neutralized with acetic acid. The resulting crude reaction product was a highly viscous, yellowish oil. Molecular weight Mw=860 (GPC)

Content of the active structural element $C_3O_2$: 21%.

Example 33

3-{(4S)-4-(ethoxycarbonyl)-4-[2-(ethoxycarbonyl)ethyl]-5-oxohexanoyloxy}-2,2-dimethylpropyl ethyl (4S)-4-acetyl-4-(ethoxycarbonyl)heptane-1,7-dioate (Photoinitiator Based on NPGDA and Acetyl Diethylglutarate)

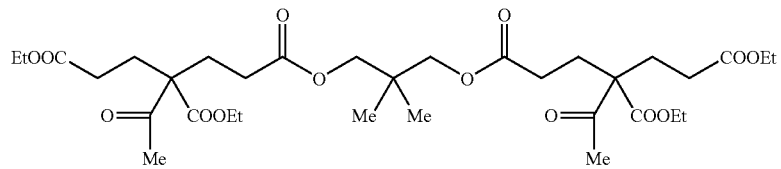

46 g of acetylglutaric acid diethyl ester and 0.5 g of 1,8-diazabicyclo-[5.4.0]-undec-7-ene were stirred at room temperature, and 21.2 g of neopentylglycol diacrylate was added drop by drop. After the first exothermic reaction finished, the mixture was stirred for 3 hours at 80° C. The subject compound remained as a slightly yellowish viscous liquid. Yield was 66.5 g. Nuclear magnetic resonance spectra and infrared spectrum confirmed the expected structure.

Content of the active structural element $C_3O_2$: 20%.

Example 34

2,2-Bis({4-(methoxycarbonyl)-4-[(methoxycarbonyl)methyl]-5-oxohexanoyloxy}methyl)butyl methyl 3-acetyl-3-(methoxycarbonyl)hexane-1,6-dioate (Photoinitiator Based on TMPTA and Acetyl Dimethylsuccinate)

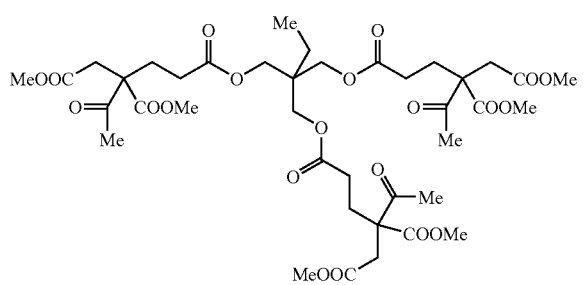

56.4 g of acetylsuccinic acid dimethyl ester and 0.5 g of 1,8-diazabicyclo-[5.4.0]-undec-7-ene were stirred at room temperature, and 30 g of trimethylolpropane triacrylate was added drop by drop. After the first exothermic reaction finished, the mixture was stirred for 3 hours at 80° C. The subject compound remained as a slightly yellowish viscous liquid. Yield was 86 g. Nuclear magnetic resonance spectra and infrared spectrum confirmed the expected structure.

Content of the active structural element $C_3O_2$: 24%.

Comparative Example 1

50.0 g of trimethylolpropane triacrylate, 50 g of tripropylene glycol diacrylate, and 15.0 g of ethyl acetoacetate were mixed, and this was heated to 50° C. before 1.5 g of 1,8-diazabicyclo-[5.4.0]-undec-7-ene (DBU) was added. The mixture was sparged with air. After the exothermic reaction started, the temperature was allowed to rise until 110° C. Then, the mixture was cooled to 80° C. and stirred for 1 hour at 80° C. After cooling, the resulting product had a viscosity of 18000 mPas at 25° C. and a molecular weight of Mw=6000.

Content of the active structural element $C_3O_2$: 6.73%.

(Properties of Cured Coatings)

The following table shows properties of various cured coatings of photocurable compositions which contain photinitiators from the above-mentioned examples.

Fist of all, photocurable compositions were prepared by mixing the composition in the table, then coated on aluminum sheets as thin films and cured by UV irradiation.

The cured coatings were tested with respect to their pencil hardness and their solvent resistance towards ethyl methyl ketone.

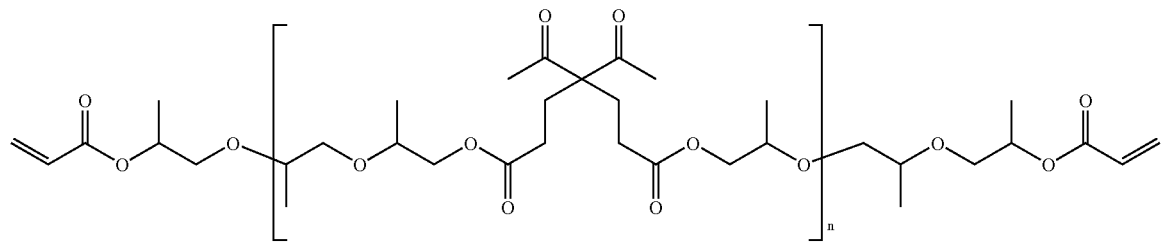

0.10 mol of 2,4-pentandione, 0.195 mol of tripropylenglycol diacrylate, and 0.45 g of tetramethylguanidine were mixed and stirred under sparging with air. After the reaction had started, the temperature was allowed to reach 90° C. Then the mixture was cooled to 80° C. and stirred at this temperature for one hour. After cooling, the product had a viscosity of 12000 mPas at 25° C. and a molecular weight of Mw=2000.

Content of the active structural element $C_3O_2$: 9.86%.

Comparative Example 2

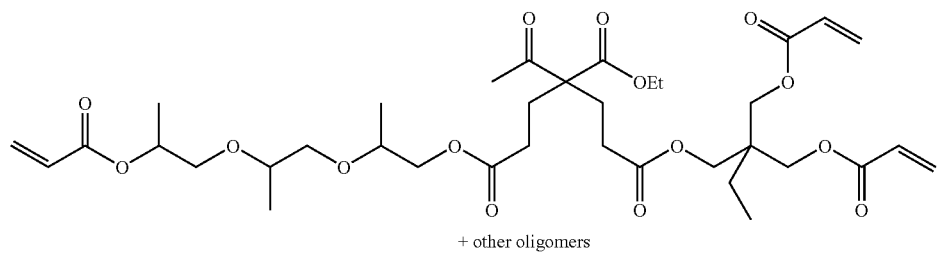

+ other oligomers

TABLE

| System | Photoinitiator from example | concentration (weight %) | test substance | exposure energy[1] | solvent resistance[2] | pencil hardness[3] |
|---|---|---|---|---|---|---|
| 1 | 12 | 3 | UV-overprint varnish[4] | 0.6 J/cm$^2$ | >75 | H–2H |
| 2 | 12 | 7 | UV-overprint varnish[4] | 0.6 J/cm$^2$ | >75 | 2H–3H |
| 3 | 13 | 8 | UV-overprint varnish[4] | 0.6 J/cm$^2$ | ~30 | HB |
| 4 | 12 | 5 | epoxy acrylate[5] | 0.6 J/cm$^2$ | >75 | 3H |
| 5 | 12 | 5 | polyester acrylate[6] | 0.6 J/cm$^2$ | >75 | H |
| 6 | 13 | 10 | polyester acrylate[6] | 0.6 J/cm$^2$ | >75 | H |
| 7[8] | 18 | 3 | epoxy acrylate[7] | 0.1 J/cm$^2$ | >75 | 4H |
| 8 | 19 | 5 | Acrylate mixture[9] | 0.5 J/cm$^2$ | >100 | 2H |

[1] Quantity of light for crosslinking produced by a F 300H-lamp (Sum UV-A-B-C), measured with a radiometer from EIT.
[2] Solvent resistance of the cured film, tested by repeatedly rubbing the cured surface with a cotton sheet soaked in ethyl methyl ketone (MEK). The number of recurrences, the so called double-rubs, performed without visible damage on the film was counted
[3] Hardness of pencil which caused visual damage on the cured film
[4] UV-overprint varnish, consisting of 40% tripropylene glycol diacrylate, 30% (trimethylolpropane) triacrylate and 30% bisphenol A diglycidylether diacrylate.
[5] Epoxy acrylate Ebecryl 120 from UCB.
[6] Polyester acrylate Ebecryl 835 from UCB.
[7] Epoxy acrylate, obtained by reacting Epiclon 1050 from DIC with acrylic acid.
[8] Curing was done at 110° C., as the curable mixture is solid at 25° C.
[9] Acrylate mixture comprising 30% by weight of Dipropyleneglycol diacrylate (DPGDA), 45% by weight of an acrylate compound obtained by reacting Epiclon 1050 from DIC with acrylic acid, and 25% by weight of Trimethylolpropane triacrylate (TMPTA).

The photoactivity of all prepared photoinitiators was tested.

For UV-curing tests, a mixture consisting of 30 weight-% tripropylene glycol diacrylate (TPGDA), 25 weight-% trimethylolpropane triacrylate (TMPTA) and 45 weight-% Ebecryl 150 (UCB) was used. A solution of 5 weight-% of the tested photoinitiator in the UV-curable mixture was prepared and coated on an aluminum sheet as a film of 50 μm thickness. The sample was irradiated with a Fusion F 300 using the H-bulb (300 W/inch). The radiation doses were 0.087 J/cm$^2$ for UV-A, 0.058 J/cm$^2$ for UV-B and 0.035 J/cm$^2$ for UV-C, which gives 180 mJ/cm$^2$ in sum. The belt-speed was adjusted to 16 m/min and 3 passes were done.

All tested photoinitiators of the invention are photoactive and initiate a polymerization under irradiation, indicated by the formation of solvent-resistant films. The solvent resistance of the cured film was tested by rubbing the film with a cotton sheet soaked with 2-butanone (methyl ethyl ketone; MEK) and counting the double rubs needed to cause visible defects in the film. The results are summarized in the following table:

| Photoinitiator according to example No. | Solvent resistance of the cured film (MEK double rubs) |
|---|---|
| 1 | >100 |
| 2 | >100 |
| 3 | >100 |
| 4 | ~12 |
| 5 | >100 |
| 6 | ~13 |
| 7 | ~32 |
| 8 | ~28 |
| 9 | >100 |
| 10 | >100 |
| 11 | >100 |
| 14 | ~40 |
| 15 | ~42 |
| 16 | ~52 |
| 17 | ~20 |
| 19[a] | >100 |
| 20 | >100 |
| 21[b] | >100 |
| 22[c] | >80 |
| 23 | >100 |
| 24 | >100 |
| 25 | ~40 |
| 26 | ~60 |
| 27 | >100 |
| 28 | ~14 |
| 29 | >100 |
| 30 | >100 |
| 31 | ~60 |
| 32 | ~70 |
| 33 | <80 |
| 34 | <100 |

[a] a test mixture consisting of 29% dipropylene glycol diacrylate (DPGDA), 42% Ebecryl 150 and 24% TMPTA was used
[b] a solution of 4 weight-% of the photoinitiator in a mixture of 20% deionized water and 76% Photomer 3165 (Cognis) was tested
[c] 10 weight-% of dimethyl sulfoxide were added to the test mixture in order to dissolve the photoinitiator As a reference, a film of the same thickness was coated on the same sheet consisting of the UV-curable mixture, however, without a photoinitiator of the present invention. This film showed no curing and was easily removed by whipping with a dry cotton sheet.

Also, the influence of the molecular weight of the photoinitiators on their photoactivity was investigated.
Substrate: Aluminum
Film Thickness: 50 μm (wet)
[1] Irradiance: 0.5 J/cm$^2$
Bulb: Fusion F 300H bulb
Test-mixture: Standard UV over-print varnish:

Dipropyleneglycol diacrylate (DPGDA) 30%
Acrylated polyester Ebecryl 150 45%
Trimethylolpropane triacrylate (TMPTA) 25%

Procedure: The photoinitiators were dissolved in the test mixture. The test mixture was applied on an aluminum substrate at a film thickness of 50 μm (wet) and cured under UV-light with a Fusion F 300 H bulb. The applied irradiance was 0.5 J/cm². Then, the coatings were assessed by appearance, solvent resistance and hardness.

| Entry | [2]PI-Type | % PI | [3]Coating viscosity | Surface appearance | [4]Solvent resistance | [5]Pencil hardness | Molecular weight |
|---|---|---|---|---|---|---|---|
| 1 | — | — | 200 mPas | wet | 0 | — | |
| 2 | A | 5 | 200 mPas | dry | >100 | 2H | 240 |
| 3 | B | 5 | 200 mPas | dry | >100 | 2H | 300 |
| 4 | C | 5 | 260 mPas | wet | ~5 | <6B | 1800 |
| 5 | C | 13.7 | 290 mPas | wet-tacky | ~25 | HB | 1800 |
| 6 | C | 24.2 | 340 mPas | tacky | >100 | H | 1800 |
| 7 | C | 32.4 | 540 mPas | dry | >100 | H–2H | 1800 |

[1]Radiant energy of the UV-bulb (total UVA-C) at the surface of the coating measured with the radiometer UVICURE from EIT company.
[2]PI type:
A = 5,5-diacetylnonane-2,8-dione, (Example 19 of this invention)
B = diethyl-4,4-diacetylheptanedioate, (Example 12 of this invention)
C = photoactive resin prepared according to U.S. Pat. No. 5945487, column 9, line 45.
[3]Coating viscosity, measured with an ICI cone and plate viscosimeter at a shear rate of 5000 D$^{-1}$
[4]Solvent resistance of the hardened film, tested by repeated rubbing of the film surface with a woodpulp cloth impregnated with methyl ethyl ketone (MEK). The number of rubbings that still did not produce any visible damage to the coating was measured.

(Properties Comparison with Conventional Phoinitiators)

| Photoinitiator | Example 19 | 2-hydroxy-2-methylpropio-phenone | Bisacylphenyl phosphineoxide |
|---|---|---|---|
| Color | Colorless | slightly yellow | slightly yellow |
| Molar extinction coefficients at 300 nm in methanol | 122 ml/g · cm | 822 ml/g · cm | 18200 ml/g · cm |

Due to the low molar extinction coefficient, photoinitiators of the present invention are particularly suitable for curing of thick coatings layers, which was demonstrated by the following experiment:

A container, having dimensions of 1 cm×1 cm×1 cm, was filled with a test mixture, containing 30% of trimethylolpropane triacrylate, 30% of bisphenol-A-diglycidylether diacrylate, 35% of dipropylene glycol diacrylate and 5% of 5,5-diacetylnonane-2,8-dione (a photoinitiator according to Example 19 of the present invention). Then, the container was irradiated from above with a Fusion F300 H bulb (Irradiance>0.25 J/cm²). After the curing process, the content of the container, which contains a cured thick layer on top and uncured liquid material beneath, was removed, and the thickness of the cured top layer was measured by a micrometer screw. Thickness of the cured layer: 800 μm.

INDUSTRIAL APPLICABILITY

The photoinitiator according to this invention is usable for curing of radical curable monomers, oligomers, or polymers. The photocurable composition of the invention may be used as coatings, printing inks and molded articles. In particularly, the photocurable composition is usable as a coating composition for thick layers of multifunctional acrylic ester groups containing mixtures. That is, the photocurable composition of the invention is characterized in that the composition exhibits excellent photosensitivity even when the coated layer has a thickness of up to 1000 μm.

As coatings, the composition can be applied to suitable substrates such as, for example, paper, polyethylene, polypropylene, polyester, polyvinylidene chloride, aluminum, steel or wood and be cured by UV-irradiation in the presence of air or a cover gas.

Among these applications, of particular importance is a coating for durable wood, can coating, or printing ink.

According to this invention, a photoinitiator can be provided, which exhibits excellent photosensitivity, and is usable in thick layer UV curable coatings.

The invention claimed is:

1. A photoinitiator consisting essentially of a compound having a molecular weight of 1000 or less, and having a chemical structure represented by formula (1),

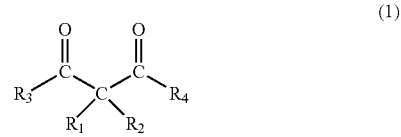

(1)

wherein $R_3$ and $R_4$ independently denote an alkyl group having a carbon number of 1 to 8, and $R_1$ and $R_2$ independently denote 1) an electron attracting group,
2) an alkyl group having a carbon number of 1 to 8, or
3) an alkyl group having a carbon number of 1 to 8, which has an electron attracting group at the β,γ, or δ position with respect to both of the carbonyl groups, wherein the alkyl group 2) is methyl or ethyl group when each of the two substituents is the alkyl group 2), and the weight percentage of the $C_3O_2$ chemical structure elements represented by the following formula (2),

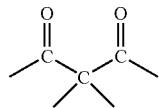

(2)

in the compound, is within the range of 17% to 54% of the total mass of the compound.

2. A photoinitiator consisting essentially of a compound having a molecular weight of 1000 or less, and having a chemical structure represented by the following formula (3),

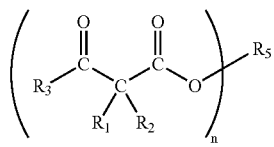

(3)

wherein
- $R_3$ denotes an alkyl group having a carbon number of 1 to 8,
- $R_5$ denotes a mono-, di-, tri-, tetra- or pentavalent aliphatic hydrocarbon group, or an alkyleneoxy group containing aliphatic hydrocarbon group,
- n is a natural number of 1 to 5, and
- $R_1$ and $R_2$ independently denote
  1) an electron attracting group,
  2) an alkyl group having a carbon number of 1 to 8, or
  3) an alkyl group having a carbon number of 1 to 8, which has an electron attracting group at the β,γ, or δ position with respect to both of the carbonyl groups, wherein the alkyl group 2) is methyl or ethyl group when each of the two substituents is the alkyl group 2), and the weight percentage of the $C_3O_2$ chemical structure elements represented by the following formula (2),

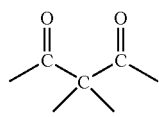

(2)

in the compound, is within the range of 17% to 47% of the total mass of the compound.

3. A photoinitiator according to claim 1, wherein the $R_1$ and $R_2$ are identical.

4. A photoinitiator according to claim 1, wherein the compound has at least one chemical structure element represented by the following formula (5),

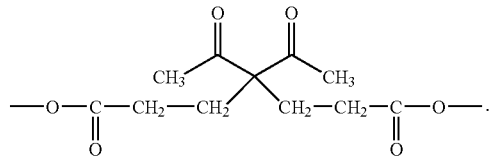

(5)

5. A photoinitiator according to claim 2, wherein the compound has at least one chemical structure element represented by the following formula (6),

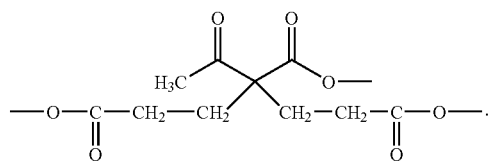

(6)

6. A compound having a chemical structure represented by the following formula (7),

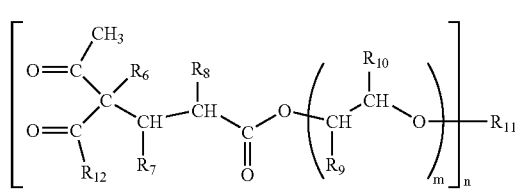

(7)

wherein
- $R_6$ denotes an alkyl group having a carbon number of 1 to 8, a $C_{1-4}$ alkyl carbonyl group, a cyano group, a $C_{1-4}$ alkyl carbonyl methyl group, a $C_{1-4}$ alkyl carbonyl ethyl group, a $C_{1-4}$ alkoxy carbonyl methyl group, a $C_{1-4}$ alkoxy carbonyl ethyl group, and an alkyl group having a carbon number of 1 to 8 which is substituted by carboxyl group or cyano group,
- $R_7$, $R_8$, $R_9$, and $R_{10}$ independently denote a hydrogen atom, or a methyl group, and at least one of $R_9$ and $R_{10}$ is a hydrogen atom,
- $R_{11}$ denotes a di-, tri- or tetra-valent aliphatic hydrocarbon group having a carbon number of 2 to 12,
- $R_{12}$ denotes a methyl group, or an alkoxy group having a carbon number of 1 to 18,
- n is a natural number of 2 to 4, and
- m is an integer of 0 to 15.

7. A photocurable composition comprising,
  (i) a photoinitiator according to the claim 1, and
  (ii) a radical curable ethylenic unsaturated compound.

8. A photoinitiator according to claim 2, wherein the $R_1$ and $R_2$ are identical.

9. A photocurable composition comprising,
  (i) a photoinitiator according to the claim 2, and
  (ii) a radical curable ethylenic unsaturated compound.

10. A photocurable composition comprising,
(i) a photoinitiator according to the claim 3, and
(ii) a radical curable ethylenic unsaturated compound.
11. A photocurable composition comprising,
(i) a photoinitiator according to the claim 4, and
(ii) a radical curable ethylenic unsaturated compound.
12. A photocurable composition comprising,
(i) a photoinitiator according to the claim 5, and
(ii) a radical curable ethylenic unsaturated compound.

13. A photocurable composition comprising,
(i) a photoinitiator according to the claim 6, and
(ii) a radical curable ethylenic unsaturated compound.
14. A photocurable composition comprising,
(i) a photoinitiator according to the claim 8, and
(ii) a radical curable ethylenic unsaturated compound.

* * * * *